(12) United States Patent
Murakami (10) Patent No.: US 6,526,185 B1
(45) Date of Patent: *Feb. 25, 2003

(54) IMAGE READING APPARATUS

(75) Inventor: Hiroshi Murakami, Toyokawa (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,523

(22) Filed: Oct. 10, 1997

(30) Foreign Application Priority Data

Feb. 18, 1997 (JP) .............................................. 9-050973

(51) Int. Cl.$^7$ .............................. G06K 7/00; H04N 1/46
(52) U.S. Cl. ....................................... 382/312; 358/505
(58) Field of Search ................................. 382/312, 313, 382/314, 315, 316, 317, 318, 319, 321, 322, 323, 324; 347/234, 248; 399/52, 212; 358/498, 492, 412, 486, 451, 428, 448, 406, 409, 413, 505; 348/244, 243; 250/238; 355/30, 69

(56) References Cited

U.S. PATENT DOCUMENTS

| | | | | |
|---|---|---|---|---|
| 5,140,445 A | * | 8/1992 | Takashima et al. | 358/483 |
| 5,189,529 A | * | 2/1993 | Ishiwata et al. | 358/451 |
| 5,198,909 A | * | 3/1993 | Ogiwara et al. | 358/412 |
| 5,715,071 A | * | 2/1998 | Takashimizu et al. | 358/498 |
| 5,821,977 A | * | 10/1998 | Nishimura | 347/234 |

FOREIGN PATENT DOCUMENTS

| | | | | |
|---|---|---|---|---|
| JP | 1-265666 A | * | 10/1989 | H04N/1/12 |
| JP | 4-292064 A | * | 10/1992 | H04N/1/00 |

* cited by examiner

Primary Examiner—Andrew W. Johns
Assistant Examiner—Duy M. Dang
(74) Attorney, Agent, or Firm—Burns, Doane, Swecker & Mathis, LLP (57) ABSTRACT

A sheet-through image reading apparatus has an operation section for setting operation conditions, a document feeder for feeding a document to a read position, and a read section for reading the document passing the read position with a stationary image sensor. A time needed to feed a document from a document tray to the read position is predicted based on the operation conditions, and the document is started to be fed at a timing before the preparation for reading is completed. Thus, the reading device are correlated to the document feeder so that the reading is started at a timing which takes scattering of the magnifying power or feed length among apparatuses into account.

18 Claims, 7 Drawing Sheets

IMAGE READING APPARATUS

BACKGROUND OF THE INVENTION

1. Field of The Invention

The present invention relates to an image reading apparatus of sheet-through type wherein a document is fed through a read position to read a document image by a stationary reading device provided at the read position.

2. Description of Prior Art

In a type of an image reading apparatus, a document put on a platen glass is read by moving an exposure lamp and an image sensor along a subscan direction. The position of a top end of the document fed onto the platen glass by the automatic document feeder is different among automatic document feeders. In order to correct the scattering of the position of the top end, an adjustment value on the position of the top end of a document has been set for each automatic document feeder, as described in Japanese Patent laid open Publication 4-292,064/1992. Then, a timing to start reading with the image sensor is corrected in correspondence to the adjustment factor. Thus, a position shift in an image read by the sensor and reproduced on a paper can be prevented.

On the other hand, in sheet-through type image reading apparatuses described in Japanese Patent laid open Publications 1-265,666/1989 and 1-167,766/1989, a document fed by an automatic document feeder is read with an image sensor which is fixed at a read position.

A prior art sheet-through type image reading apparatus is known to start reading with the sensor when a document which is fed by a document feeder from a standby position reaches the read position. In such an apparatus, after the apparatus starts preparation operations such as warming-up of the exposure lamp, a certain time is needed until the image sensor is ready for reading an image. On the other hand, a certain feed time t1 is needed for a document to be carried from the standby position to the read position, and the carriage time depends on operation conditions and the like. For normal reading, it is needed that preparation for reading has to be completed before the reading is started. Then, in prior art image reading apparatuses, after a document is kept at the standby position for a standby time, the document is started to be fed at a timing earlier by $T1_{min}$ than the time when the preparation for reading is completed, wherein $T1_{min}$ is a minimum of T1 in various operation conditions of the document feeder. Thus, it is prevented that the document reaches the read position before the preparation operation for reading is completed.

As described above, in the prior art sheet-through type image reading apparatus, a document is started to be fed always at the timing earlier by the minimum time $T1_{min}$ than the time when the preparation for reading is completed, irrespective of operation conditions. Then, in an operation condition where the actual document feed time $T1_a$ is longer than the minimum $T1_{min}$, a time loss occurs after the preparation condition for image reading is completed, because a certain time is waited for the document to reach to the read position. That is, if document is fed in an operation condition that $t1=T1_a$ ($>T1_{min}$), the document reaches the read position when a time of $(T1_a-T1_{min})$ elapses further after the preparation operation completes. Thus, a time loss of $(T1_a-T1_{min})$ occurs.

SUMMARY OF THE INVENTION

An object of the present invention is to provide an imaging reading apparatus which can start reading at an appropriate timing to improve read efficiency.

In one aspect of the invention, an image reading apparatus has a reading device for reading a document fed by a document feeder. The reading device is correlated to the document feeder so that the reading is started at an earlier timing which takes scattering of the magnifying power or feed length among apparatus into account as described below. Operation conditions for reading are set with a setting device. The document feeder starts to feed a document from a start position and passes a read position at a speed corresponding to the operation conditions. The image reading device reads the document fed by the document feeder at the read position after preparation for reading based on the operation conditions is completed. A first time is calculated which is earlier by a period needed for the document feeder to feed a document from the start position to the read position than a second time when the preparation for reading completes, and the first time is set for the document feeder to start to feed a document.

In a second aspect of the invention, an image reading apparatus also has an image reading device for reading a document fed by a document feeder. On the other hand, a correction value on a feed length from the start position to the read position is set, wherein the feed length scatters for each image reading apparatus. Then, a period is calculated needed for the document feeder to feed a document from the start position to the read position based on a design feed length and the correction value, and a first time is calculated earlier by the period than a second time when the preparation for reading completes. Then, the first time is set for the document feeder to start to feed a document. The document feeder starts to feed a document from a start position to pass the read position at a predetermined speed. The image reading device reads the document at a predetermined read position after preparation for reading based on the operation conditions is completed.

An advantage of the present invention is that a document can be read efficiently.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
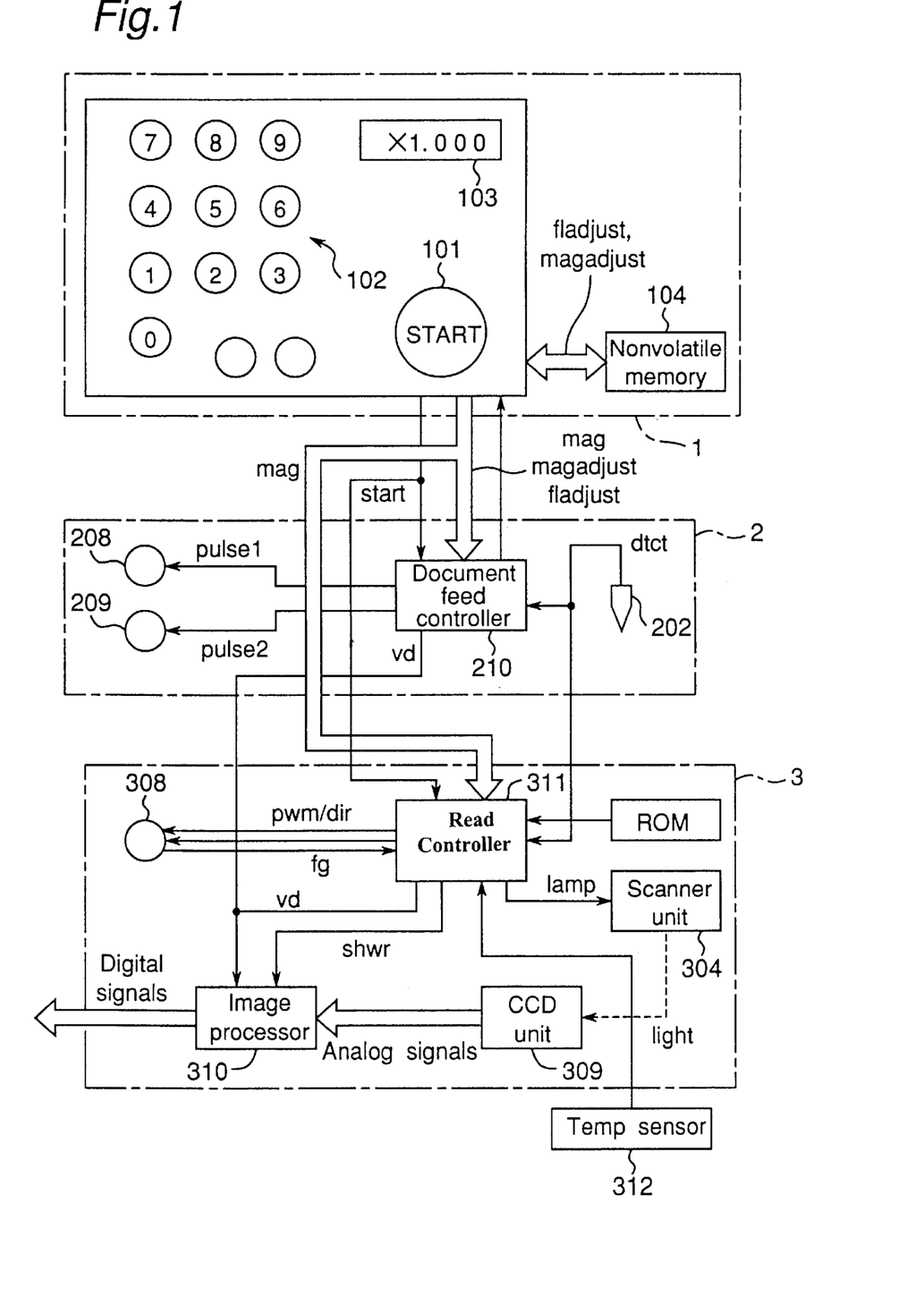
FIG. 1 is a block diagram of an image reading apparatus.
Figure 2:
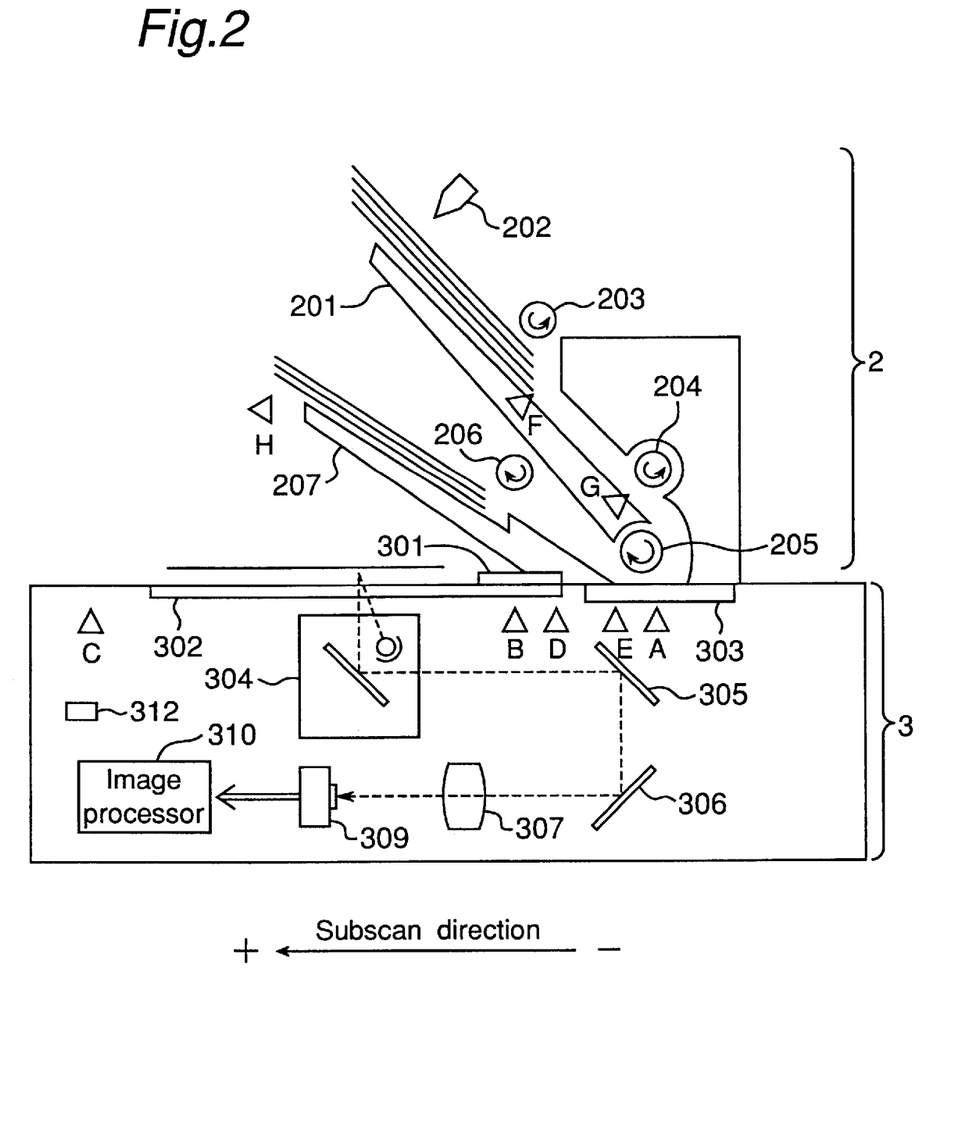
FIG. 2 is a schematic sectional view of the image reading apparatus shown in FIG. 1.

Referring now to the drawings, wherein like reference characters designate like or corresponding parts throughout the several views, FIG. 1 shows a block diagram of an image reading apparatus of an embodiment of the invention, and FIG. 2 is a schematic sectional view of a part thereof. The apparatus has sheet-through mode where a document passing a read position A on a glass 303 (FIG. 2) at a predetermined speed is read with a scanner unit 304 which is kept station ary, and manual mode where a document set stationarily on a platen glass 302 manually is read with the scanner unit 304 which is moved at a predetermined speed in the subscan direction. Image reading in the sheet-through mode is started when start key 101 is pressed if the existence of a document on a document tray 201 is detected with a document sensor 202. Image reading in the manual mode is started when start key 101 is pressed if any document in a document tray 201 is not detected with the document sensor 202.

The image reading apparatus comprises an operation section 1, a document feeder 2 and a read section 3. The operation section 1 is provided to instruct an operation such as start of image reading and to set various values such as correction values for magnifying power and for document feed distance.

First, the operation section 1 is explained. The operation section 1 comprises start key 101 for starting read operation, ten-keys 102 for setting various values such as the correction values for magnifying power and for document feed distance, a display panel 103 for displaying the various values, and a non-volatile memory device 104 for storing the various values set with the ten-keys 102.

When start key 101 is pressed, start signal "start" of level "1" is sent to controllers 210 and 311 of the automatic document feeder 2 and the read section 3. When the magnifying power is set, it is also sent to the two controllers 210 and 311. When the correction value for the magnifying power is set, it is sent to the controller 210 of the automatic document feeder 2 and is stored in the non-volatile memory device 104. Similarly, when the correction value for the document feed distance is set, it is sent to the controller 210 of the document feeder 2 and is stored in the nonvolatile memory device 104.

The correction values for magnifying power and for document feed distance stored in the non-volatile memory device 104 are read and sent to the controller 210 of the document reader 2 each time the electrical power source is turned on. The correction value for magnifying power is provided to correct an error of the magnifying power due to a difference in the mechanical parts among the automatic document feeders. The correction value for document feed distance is provided to correct an error of the document feed distance due to mechanical scattering among the document feed distance from the standby position G to the read position A in the document feeder 2 which should be the same design document feed distance. The correction values for magnifying power and for document feed distance are set and stored in the non-volatile memory device 104 for each automatic document feeder when it is assembled in a factory. By using the non-volatile memory device 104, it is not needed to set them each time the electrical power source is turned on. That is, they are read from the non-volatile memory device 104 when the electrical power source is turned on.

Next, the automatic document feeder 2 is explained with reference to FIG. 1. Documents are put on the tray 201, and a document sensor 202 detects whether any document exists on the tray 210 or not. A paper-feed roller 203 is driven by a paper feed motor 208 to send the documents on the tray 201 one by one to a feed path. A timing roller 204 keeps a document at the standby position G temporarily and sends it at a timing instructed by the controller 210. A main roller 205 feeds the document above the read position A, and a discharge roller 206 discharges the document to a discharge tray 207. A main motor 209 drives the timing roller 204, the main roller 205 and the discharge roller 206. The controller 210 has a central processing unit, a read only memory and a random access memory (not shown), and it has a function to control the stepping motors 208 and 209.

When the document sensor 202 detects the existence of documents, a document detection signal "dtct" of level "1" is sent to the controller 210 of the automatic document feeder 2 and to the controller 311 of the read section 3. On the other hand, When the document sensor 202 detects the non-existence of any document, a document detection signal "dtct" of level "0" is sent to the controllers 210 and 311. The controllers 210 and 311 start the control in the sheet-through mode when the start signal "start" of "1" is received from the operation section 1 while the document detection signal "dtct" is at level "1". On the other hand, the controllers 210 and 311 start the control in the manual mode when the start signal "start" of "1" is received from the operation section 1 while the document detection signal "dtct" is at level "0".

The CPU in the document feed controller 210 has the function to drive the stepping motors 208, 209, and the motors 208 and 209 are driven at speeds in correspondence to pulse periods of driving pulses "pulse1" and "pulse2" received from the document feed controller 210. When the CPU sets a document feed speed at an internal variable "fspeed1" and a document feed distance at another internal variable "flength1" and sets an internal flag "fdrive1" (step S103 in FIG. 4A), a drive pulse "pulse1" is output automatically to drive the paper feed motor 208. Then, the paper feed roller 203 is rotated to feed a document at the predetermined document feed speed by the predetermined feed distance.

Similarly, when the CPU sets document feed speed at an internal variable "fspeed2" and document feed distance at another internal variable "flength2" and sets an internal flag "fdrive2" (step S110 in FIG. 4B), a drive pulse "pulse1" is output automatically to drive the main motor 209. Then, the timing roller 204, the main roller 205 and the discharge roller 206 are rotated to feed the document at the standby position "G" at the predetermined document feed speed by the predetermined feed distance.

Further, the above-mentioned function for driving the stepping motors detects the position of the document based on the output pulses of the driving pulses "pulse1" and "pulse2", and it writes the actual document feed distance from the tray position "F" automatically to an internal variable "fposition". The variable "fposition" is used to decide whether the document is fed by the paper feed distance (step S104 in FIG. 4A, step Sill in FIG. 4B).

Figure 4A:
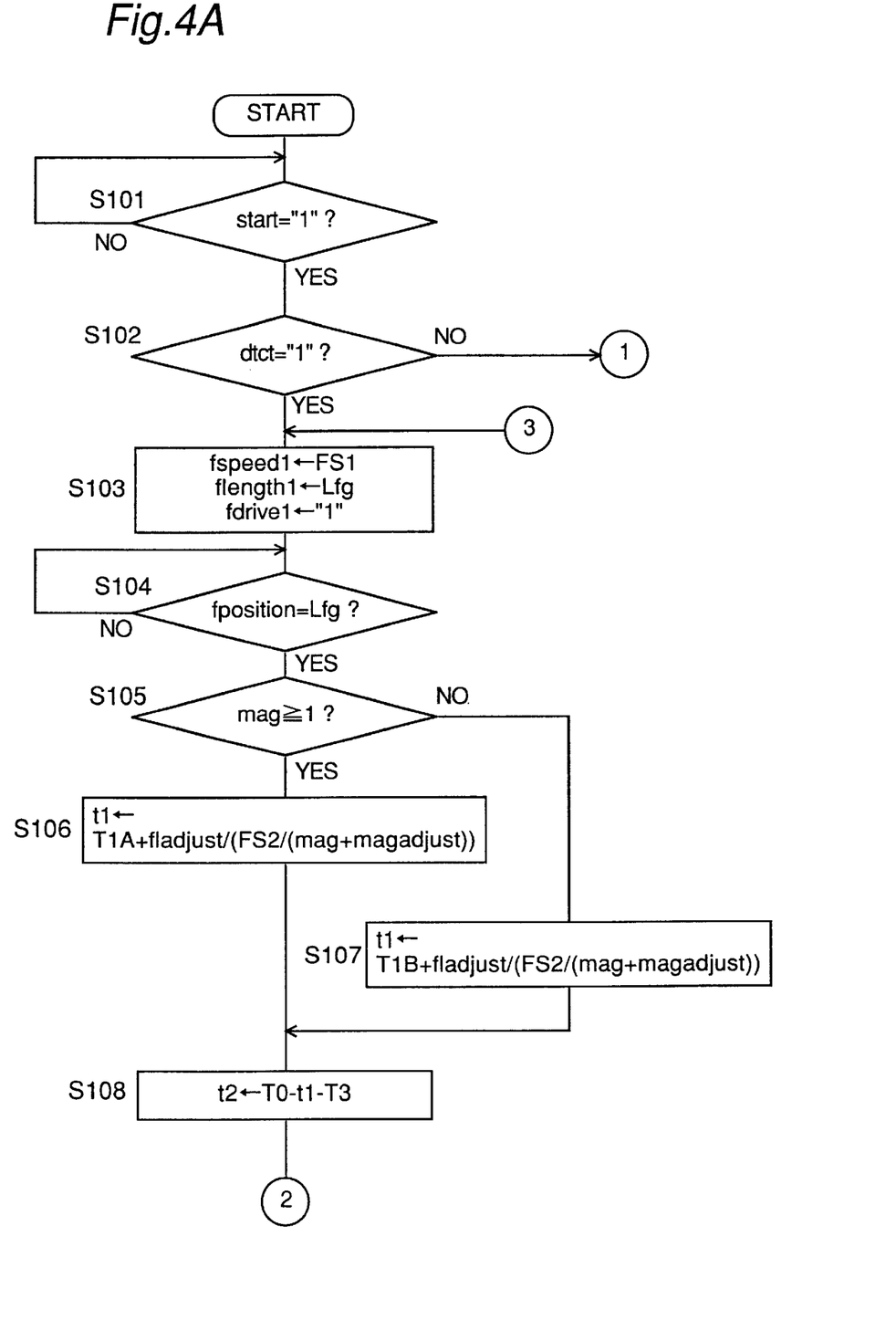
FIGS. 4A and 4B are a flowchart of processing of the document feed controller.
Figure 4B:
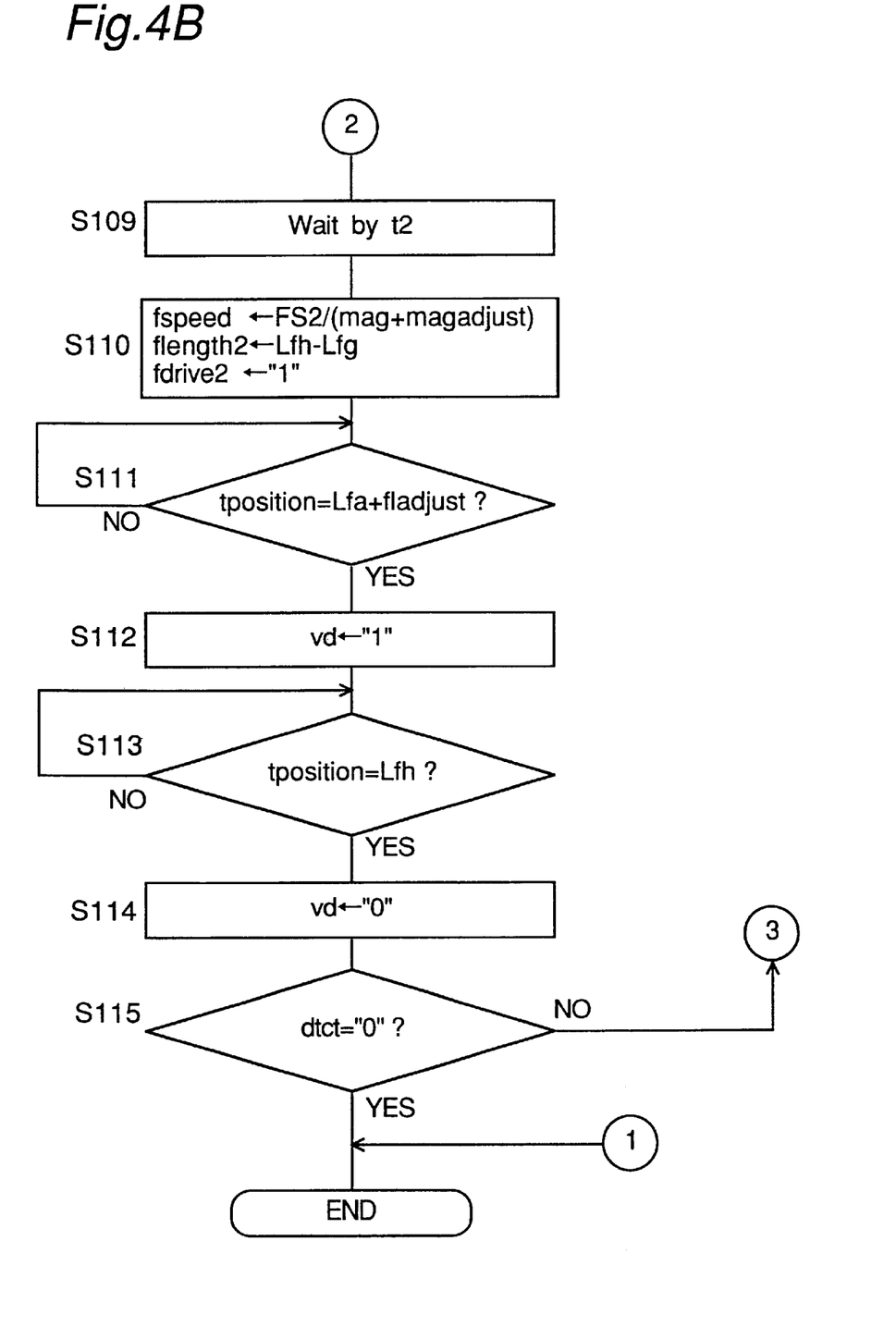

In the sheet-through mode, the controller 210 of the document feeder 2 detects the document reaching to the read position "A" with reference to the internal variable "fposition", and sets image read signal "vd" at the detection time for the image processor 310 in the read section 3 (step S112 in FIG. 4B).

Following variables are defined. The distance from the tray position "F" to the discharge tray position "H" is denoted as "Lfh", and the distance from the tray position "F" to the read position "A" is denoted as "Lfa". The standard distance from the document tray position "F" to the read position "A" is denoted as "Lfa". The standard distance means a distance when there is no mechanical scattering among the automatic document feeders (that is, design feed path length).

Next, the read section 3 is explained. A document is put on the platen glass 302 in the manual mode, and a document is fed onto the other platen glass 303 in the sheet-through mode. A white standard plate or shading correction plate 301 is provided at an end of the platen glass 302. A scanner unit 304 including a first mirror and a lamp as shown in FIG. 2 is moved by a scanner motor 308 along the subscan direction. A second mirror 305 and a third mirror 306 are moved also in the same direction. The lamp exposes a document, and a light reflected from a document on the platen glass 302 is reflected by the mirrors 304, 305 and 306 and transmits through a lens 307 onto a CCD unit 309, which converts optical signals to electrical analog signals. An image processor 310 converts the analog signals to digital image signals. Then, it performs various digital image processings such as shading correction and sends the obtained digital signals to an output apparatus such as a printer.

The scanner motor 308 is a DC motor having a rotary encoder and it is driven according to power supply signal "pwm" of level "1" and a direction signal "dir" received from the controller 311 of the reader 3. The CPU in the controller 311 has the function to drive the DC motor 308, and it outputs the power supply signal "pwm" automatically for driving the scanner motor 308 by setting a moving speed at a internal variable "sspeed" and sets an internal flag "sdrive" (steps S004 and S010 in FIG. 3). Thus, the scanner unit 304 is moved at the determined speed along the determined direction.

Further, the above-mentioned function for driving the DC motor detects the position of the scanner unit 304 based on the number of input pulses of pulse signals "fg" from the rotary encoder, and it writes the distance from the read position "A" automatically to the internal variable "sposition". The variable is used to decide whether the scanner unit 304 is fed by the determined distance in the determined direction or not (steps S005 and S011 in FIG. 3).

Figure 3:
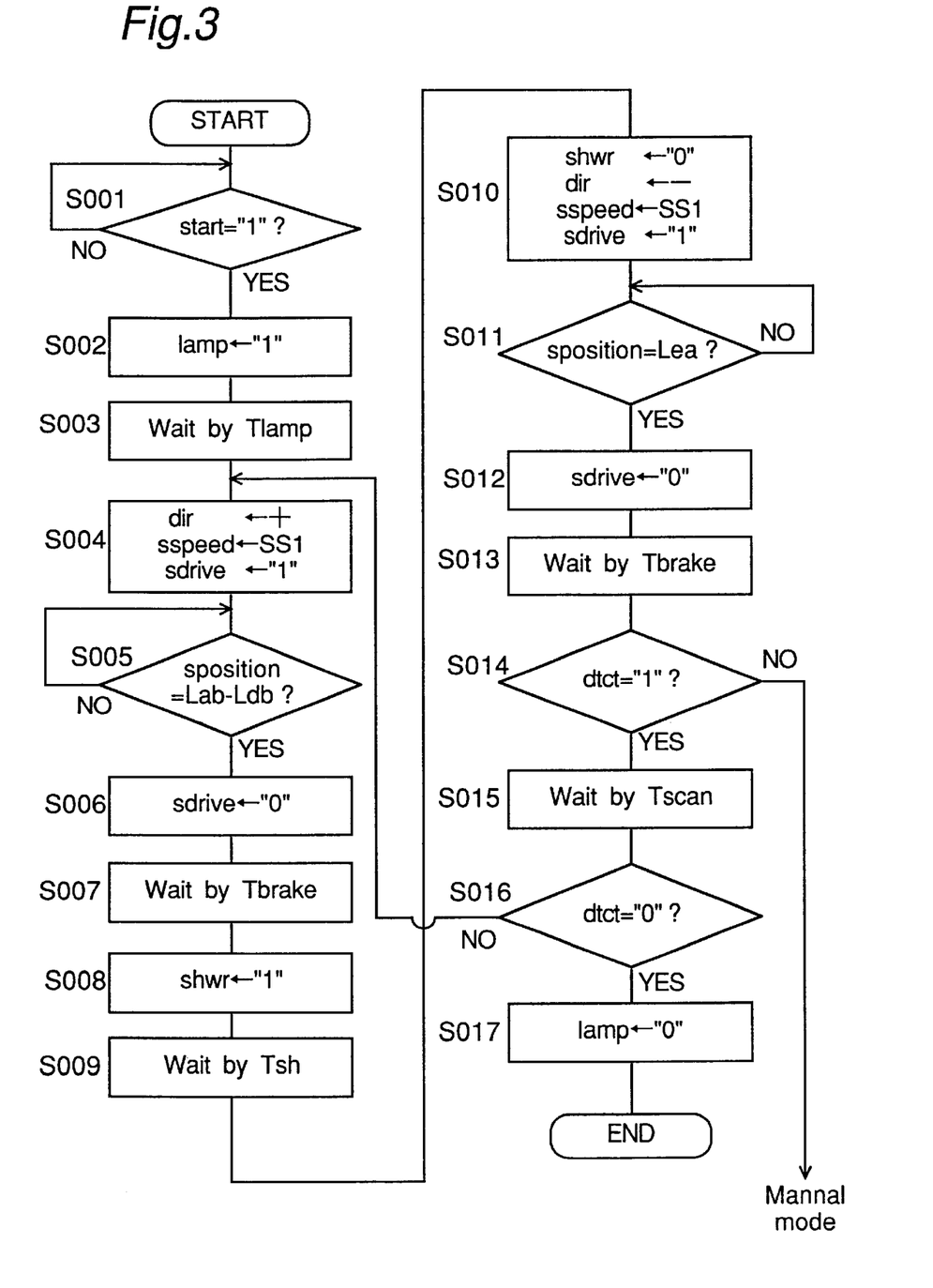
FIG. 3 is a flowchart of a reading controller.

Preparation operations are started when the start signal "start" of level "1" is received from the operation section 1 (step S001 in FIG. 3). That is, the controller 311 sends a lamp signal "lamp" of level "1" to the scanner unit 304 (step S002 in FIG. 3) to turn on the lamp in order to start warming-up the lamp. Further, the scanner unit 304 is moved to the read position B at the white standard plate 301 (steps S004–S007). Then, the white standard plate 301 is read, and standard data for shading correction are sampled. Other preparation operations are also performed.

In the sheet-through mode, the scanner unit 304 is moved to the read position "A" and kept stationary. Then, a document fed by the document feeder 1 is read while it passes through the read position "A". In the manual mode, the scanner unit 304 is moved to the read start position "C" and the document put manually on the platen glass 302 is read while the scanner unit 304 is moved from the read start position "C" to the read position "A".

Standard data for shading correction are sampled as explained below. When the controller 311 sends the shading data sampling signal "shwr" of level "1" to the image processor 310 (step S008 in FIG. 3), the image processor 310 samples standard data with a digital IC provided therein and stores them in a memory device in the digital IC as shading correction data.

In the manual mode, the controller 311 of the read section 3 sends image read signal "vd" of level "1" to the image processor 310. When the image read signal vd of level "1" is received from the controller 311 of the reader 3 or the controller 210 of the document feeder 2, the image processor 310 performs shading correction based on the shading correction data for the digital image signals read by the CCD unit 309. Then, it outputs the corrected signals to the output apparatus. In this processing, "Lab" denotes a distance from the read position A to the read position B at the white standard plate 301.

Next, the controller 311 of the read section 3 is explained with reference to a flowchart shown in FIG. 3. First, it is waited until the start signal of level "1" is received from the operation section 1 (step S001). When the start signal of level "1" is received (YES at step S001), preparation processing of steps S002 to S013 is started.

First, the lamp signal "lamp" is set at level "1" (step S002), and the lamp in the scanner unit 304 is turned on to expose a document. Next, a time of Tlamp is waited (step S003), so that the lamp has been warmed up and the light intensity of the lamp is stabilized.

Next, the direction signal "dir" for instructing the rotation direction of the scanner motor 308 is set at level of "1" (or "+" direction), moving speed SS1 is set at the internal variable "sspeed" for instructing the rotation speed of the scanner motor 308, and the internal flag "sdrive" is set at level "1" (step S004). The direction signal "dir" represents "+" direction at level "1" and "−" direction at level "0".

Next, it is waited that the scanner unit 304 reaches to the position "D" before the white reference position "B" (step S005). That is, it is waited that the value of the internal variable "sspeed" which represents the moving distance from the read position "A" is equal to a difference between the distance "Lab" from the read position "A" to the white reference position "B" and the distance "Ldb" from the position "D" to the white reference position "B". In other words, the position "D" is a position where the scanner unit 304 should stop at the white standard position "B" when the scanner unit 304 starts to reduce speed at the position "D".

When the scanner unit 304 reaches to the position "D" (YES at step S005), the internal flag "sdrive" is reset at level "0" (step S006). Thus, the scanner motor 308 is stopped to be driven, and the scanner unit 304 begins to reduce speed. Then, a time "Tbrake" is waited to elapse which is necessary for the scanner unit 304 to stop (step S007).

Next, the shading data sampling signal "shwr" for the image processor 310 is set at level "1" for shading correction (step S008). Then, data for shading correction is started to be sampled for the image processor 310. Then, a time "Tsh" is waited which is necessary for sampling the shading correction data for the image processor 310 (step S009).

Next, the shading data sampling signal "shwr" for the image processor 310 is set at level "0", and sampling for shading correction is stopped. Further, the direction signal "dir" for instructing the rotation direction of the scanner motor 308 is set at level "0" for reversing the moving direction, moving speed SS1 is set at the internal variable "sspeed" for instructing the rotation speed of the scanner motor 308, and the internal flag "sdrive" is set at level "1" (step S0010). Thus, the scanner motor 308 is driven so that the scanner unit 304 is moved from the white standard plate "B" at the speed SS1 in the "−" subscan direction (FIG. 2).

Next, it is waited that the scanner unit 304 reaches the position "E" located before the read position "A" (step S011). That is, it is waited that the value of the internal variable "sposition" on the distance from the read position "A" is equal to the distance "Lea" between the read position "A" and a position "E". The position "E" is a position where the scanner unit 304 should stop at the position "A" when the scanner unit 304 starts to reduce speed at the position "E".

When the scanner unit 304 reaches to the position "E" (YES at step S011), the internal flag "sdrive" is reset at level "0" (step S012). Thus, the scanner motor 308 is stopped to be driven, and it starts to reduce speed. Then, a time "Tbrake" is waited which is necessary for the scanner unit 304 to stop (step S013).

Thus, preparation operations for reading are completed. Then, it is decided according to the document detection signal "dtct" of the document sensor 202 whether the current mode is the sheet-through mode or the manual mode (step S014). If the document detection signal "dtct" is level "0" (NO at step S014), or if no document is put in the tray 201, processing for the manual mode is performed to read a document put on the platen glass 302. The explanation of the manual mode is omitted here.

On the other hand, if the document detection signal "dtct" is level "1" (YES at step S014), or if a document is decided to exist on the tray 201, processing for the sheet-through mode is performed to read the document passing the read position "A". That is, a time "Tscan" is waited which is necessary for reading the document passing the read position "A" (step S015). During the waiting time, the controller 210 performs steps S112 to S114 shown in FIG. 4B, and the image read signal "vd" is set in a necessary range. Thus, the image processor 310 sends digital image signals.

Next, the document detection signal "dtct" is checked (step S016). If the document detection signal "dtct" is decided to be "1" (NO at step S016), or if a document exists on the tray 201, the flow returns to step S004 to resume the above-processings for the next document. On the other hand, if no document exists on the tray 201 (NO at step S016), the lamp signal "lamp" is reset at level "0" (step S0017), and the flow ends.

Figure 5:
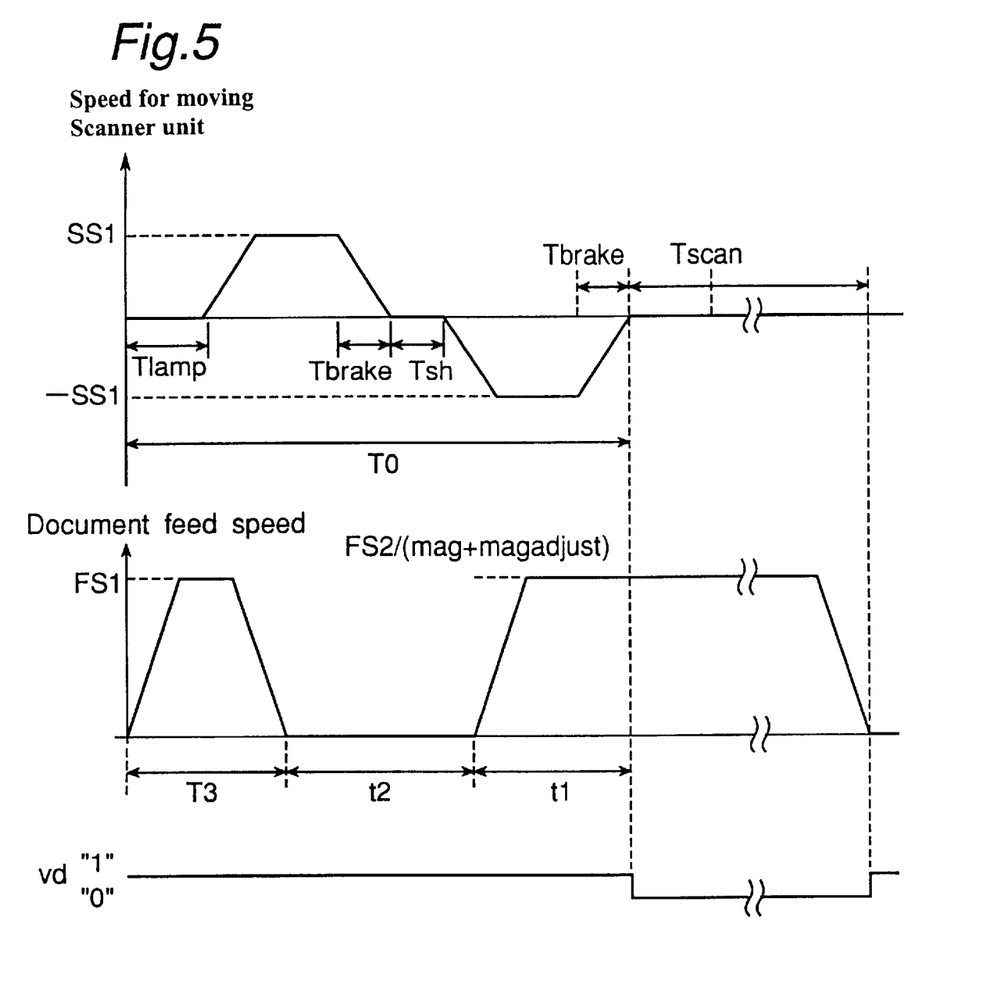
FIG. 5 is a time chart on the movement of a scanner unit and document feed.

Next, the controller 210 for the automatic document feeder 2 is explained with reference to a flowchart shown in FIGS. 4A and 4B. Further, FIG. 5 is a time chart on the movement of the scanner unit and document feed. First, it is waited until the start signal of level "1" is received from the operation section 1 (step S101). When the start signal of level "1" is received (YES at step S101), it is decided according to the document detection signal "dtct" of the document sensor 202 whether the current mode is the sheet-through mode or the manual mode (step S102). If it is decided that the current mode is the manual mode (NO at step S102), it is not needed to feed a document. Then, the automatic document feeder 2 is operated. The explanation of the manual mode is omitted here.

If it is decided that the current mode is the sheet-through mode (YES at step S102), processings for document feeding at step S103 and thereafter are performed. First, document feed speed FS1 is set at the internal variable "fspeed1", document move distance "Lfg" is set at the internal variable "flength1", and the internal flag "fdrive1" is set at level "1" (step S103). Thus, the stepping motor drive function in the CPU supplies pulses "pulse1" automatically to drive the paper feed motor 208, so that the document is moved at the speed "FS1" by the distance "Lfg" to be fed to the standby position G. The stepping motor drive function also performs automatically the acceleration at the start, the deceleration at the stop and the resetting of the internal flag "fdrive" after the stop.

Next, it is waited until the internal variable "fposition" becomes Lfg (step S104). That is, it is waited that a document at the document tray position F is fed by distance Lfg to arrive at the standby position G.

Next, a feed time "t1" is calculated which is necessary to feed a document from the standby position G to the read position A according to the following relation based on the operation conditions set by the operation section 1. That is, if mag≧1 (YES at step S105), $$t1=T1A+fladjust/(FS2/(mag+magadjust))$$

(step S106), while if mag<1 (NO at step S105), $$T1=T1B+fladjust/(FS2/(mag+magadjust))$$

(step S107), wherein "mag" (0.4≧mag≧4.0) denotes an internal variable which stores the magnifying power received from the operation section 1, and "magadjust" (−0.05<magadjust<0.05) is an internal variable which stores the correction value for feed distance received also from the operation section 1. A variable "T1A" denotes a constant which represents feed time for magnifying power of one (mag=1.0) when the document feed distance is the standard one (fladjust=0). If the magnifying power is larger than one (1.0<mag≧4.0), the paper feed speed is slower and the feed time for fladjust of zero becomes longer than T1A. A variable "T1B" denotes a constant which represents feed time for magnifying power of 0.5 (mag=0.5) when the document feed distance is the standard one (fladjust=0). If the magnifying power is larger than 0.5 (0.5<mag<1.0), the paper feed speed is slower and the document feed time for fladjust of zero becomes longer than T1B. Further, "FS2" denotes a constant which represents document feed time for magnifying power of 1.0 (mag=1.0). Therefore, the term, (mag+magadjust), represents magnifying power corrected by the correction value, the term , FS1/ (mag+magadjust), represents document feed speed at the corrected magnifying power, and the term, fladjust/(FS2/(mag+magadjust)), represents a change in feed time, t1, according to the feed distance corrected by the correction value for the feed distance.

Figure 6:
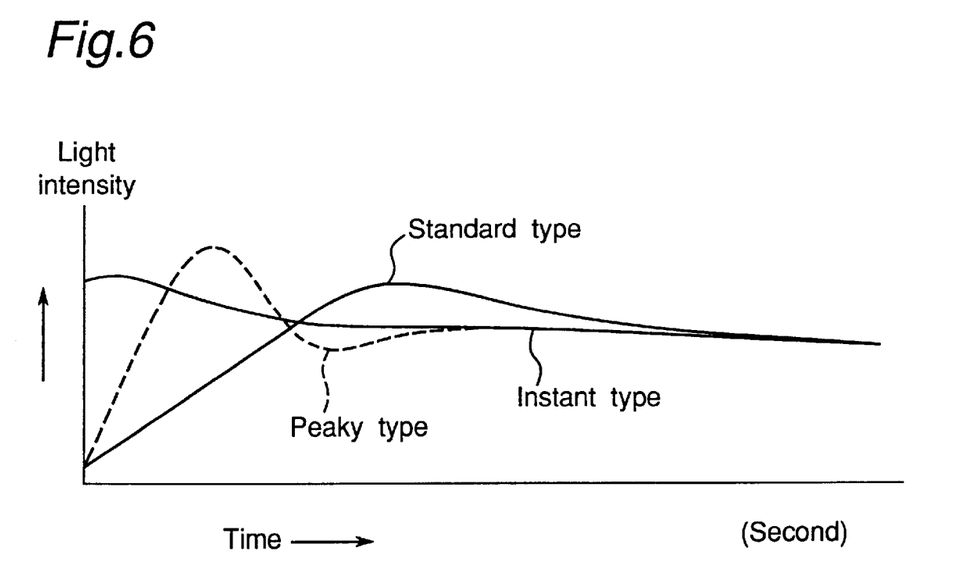
FIG. 6 is a diagram on starting characteristics of a lamp.

Next, standby time "t2" at the standby position G is calculated based on the document feed time ti obtained at steps S105–S107 (step S108):

$$t2=T0-t1-T3,$$

wherein To denotes a time necessary for preparation operations at steps S002–S013 in the flow shown in FIG. 3 and the time T3 denotes a constant which represents a time needed to feed a document to the standby position G. The preparation time, TO, includes warming-up time for the lamp. However, the warming-up time depends on (a) the ambient temperature and on (b) the history whether the lamp is turned on just after it was turned off or it was turned off well before. The light intensity of the lamp will change in various ways according to the history, and FIG. 6 shows examples of three typical types when the lamp is a fluorescent lamp. Therefore, the warming-up time is read from a table stored in the ROM wherein the warming-up table is set according to the temperature detected with a temperature sensor set in the read section 3 and to the history of the lamp. Then, TO is determined with reference to the warming-up time obtained from the table and the time for the other preparation operations such as sampling of shading correction data.

Next, it is waited that the time t2 set at step S108 elapses (step S109).

Next, the document feed time, FS2/(mag+magadjust), is set at the internal variable "fspeed2", the document move distance, (Lfh−Lfg), is set at the internal variable "flength2", and the internal flag, fdrive2, is set (step S110). Thus, the stepping motor drive function in the CPU supplies pulses "pulse2" automatically to drive the main motor 209 so that the document is moved at the speed FS2/(mag+magadjust) by the distance (Lfh−Lfg) to be stopped at the tray position H. The distance (Lfh−Lfg) represents a distance from the standby position G to the tray position H.

Next, it is waited until the document arrives at the read position A (step Sill). If there is no scattering on document feed length among the document feeders, the value of the internal variable fposition is Lfa. If it is corrected by taking the scattering for each document feeder into account, the value of "fposition" is (Lfa+fladjust). Then, it is waited at this step that the actual feed distance of the document becomes the corrected feed distance (Lfa+fladjust).

When the document arrives at the read position (YES at step Sill), the image read signal vd is set at level "1" (step S112). Then, reading of a document image and output of digital image signals to the output apparatus are started.

Next, it is waited until the document arrives at the tray position H (step S113). The value of the internal variable fposition is Lfh at the tray position H, and it is waited until fposition becomes Lfh. When the document arrives at the tray position H (YES at step S113), the image read signal "vd" is reset at level "0" (step S114), to complete image reading.

Next, the document detection signal "dtct" is checked. If a next document is decided to exist (YES at step S115), the flow returns to step S103 for resuming the above processing for the next document. On the other hand, if a next document is decided not to exist (NO at step S115), the flow ends.

In the image reading apparatus explained above, the CCD unit 309 and the automatic document feeder 2 are operated in an associated way in the sheet-through mode so that reading is started at the most appropriate timing according to the operation conditions. Thus, a document image can be read by preventing time loss.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image reading apparatus comprising:
   a document feeder for feeding a document having an image to be read along a document feed path;
   an image reader for reading the image of the document being fed by the document feeder as the document is passing over a read position on the document feed path at a predetermined speed;
   a condition setter for setting operation condition of the image reading apparatus; and
   a controller for executing the following processing:
      calculating a time period required for the document feeder to feed the document from a predetermined position on the document feed path to the read position based on the operation condition set by the condition setter; and
      controlling the document feeder to start to feed the document, from the predetermined position, at the calculated time period before preparation for reading the document is completed so that the document reaches the read position approximately at the same time when the preparation for reading the document is completed.

2. The image reading apparatus according to claim 1, wherein the operation condition include magnifying power for reading the document.

3. The image reading apparatus according to claim 1, further comprising a memory device for storing therein correction values to correct an error due to individual difference between image reading apparatuses,
   wherein the controller calculates the time period based on the correction values stored in the memory device in addition to the operation condition set by the condition setter.

4. The image reading apparatus according to claim 3, wherein the correction values include a value to correct an error of magnifying power for reading the document.

5. The image reading apparatus according to claim 3, wherein the correction values include a value to correct an error of a document feed distance between the predetermined position to the read position.

6. The image reading apparatus according to claim 1, wherein the image reader is provided with a lamp for irradiating the document, and the preparation for reading the document include warming-up of the lamp.

7. The image reading apparatus according to claim 1, further comprising an image processor for performing shading correction,
   wherein the preparation for reading the document include sampling of data for the shading correction.

8. The image reading apparatus according to claim 1, wherein the document feeder is provided with a document tray from which the document is fed toward the predetermined position, and the document feeder temporarily stops the document fed from the document tray at the predetermined position and then feeds the document to the read position.

9. A method for reading an image of a document by an image reading apparatus provided with a document feeder for feeding a document, having an image to be read, along a document feed path and an image reader for reading the image of the document being fed by the document feeder as the document is passing over a read position on the document feed path at a predetermined speed, the method comprising the steps of:
   obtaining operation condition of the image reading apparatus;
   calculating a time period required for the document feeder to feed the document from a predetermined position on the document feed path to the read position based on the obtained operation condition; and
   controlling the document feeder to start to feed the document, from the predetermined position, at the calculated time period before preparation for reading the document is completed so that the document reaches the read position approximately at the same time when the preparation for reading the document is completed.

10. The method according to claim 9, wherein the operation condition include magnifying power for reading the document.

11. The method according to claim 9, further comprising a step of obtaining correction values to correct an error due to individual difference between image reading apparatuses,
   wherein, at the step of calculation, the time period is calculated based on the obtained correction values in addition to the obtained operation condition.

12. The method according to claim 11, wherein the correction values include a value to correct an error of magnifying power for reading the document.

13. The method according to claim 11, wherein the correction values include a value to correct an error of a document feed distance between the predetermined position to read position.

14. The method according to claim 9, wherein the preparation for reading the document include warming-up of a lamp of the image reader.

15. The method according to claim 9, wherein the preparation for reading the document include sampling data for shading correction.

16. The method according to claim 9, wherein the document feeder is provided with a document tray from which the document is fed toward the predetermined position, and, at the step of control, the document is started to feed from the predetermined position to the read position after the document fed from the document tray is temporarily stopped at the predetermined position.

17. The image reading apparatus according to claim 1, wherein the image reader has a scanner unit which remains stationary at the reading position while the document is moved past the reading position to read the image.

18. The method according to claim 9, wherein the image reader has a scanner unit which remains stationary at the reading position while the document is moved past the reading position to read the image.

* * * * *